United States Patent [19]
Albrecht et al.

[11] Patent Number: 5,512,326
[45] Date of Patent: Apr. 30, 1996

[54] METHOD AND APPARATUS FOR FORMING MONOMOLECULAR FILM OR BUILT-UP MONOMOLECULAR FILM

[75] Inventors: Otto Albrecht, Atsugi; Hiroshi Matsuda, Isehara, both of Japan

[73] Assignee: Canon Kabushiki Kaisha, Tokyo, Japan

[21] Appl. No.: 200,317

[22] Filed: Feb. 23, 1994

Related U.S. Application Data

[63] Continuation of Ser. No. 891,207, Jun. 1, 1992, abandoned.

[30] Foreign Application Priority Data

Jun. 12, 1991 [JP] Japan ...................... 3-140115

[51] Int. Cl.$^6$ ................. B05D 1/20; B05C 3/00
[52] U.S. Cl. .................. 427/430.1; 427/434.3; 118/402
[58] Field of Search .......... 118/402; 427/434.2, 427/434.3, 430.1

[56] References Cited

U.S. PATENT DOCUMENTS

| | | | |
|---|---|---|---|
| 4,224,896 | 9/1980 | Barraud et al. | 118/402 |
| 4,783,348 | 11/1988 | Albrecht et al. | 118/402 |
| 4,840,821 | 6/1989 | Miyazaki et al. | 427/430.1 |
| 5,143,745 | 9/1992 | Maganas et al. | 427/434.3 |

FOREIGN PATENT DOCUMENTS 422925  1/1935  United Kingdom .............. 118/402

OTHER PUBLICATIONS

A. Barraud et al., "A Trough For Continuous Fabrication Of Langmuir–Blodgett Films," *Thin Solid Films*, vol. 99, Jan. 14, 1983, pp. 221–225.

W. Nitsch et al., "Convective Compression In Channel Flow: Behaviour And Transfer Of Soluble And Insoluble Films," *Thin Solid Films*, vol. 178, (1989), pp. 145–155 (no month date).

O. Albrecht et al., "Industrial Scale Production of L–B Layers," *Molecular Electronics Biosensors and Biocomputers*, Edited by F. T. Hong, pp. 41–49 (no date).

Patent Abstracts of Japan, vol. 10, No. 49 (C–330)(2106) 26 Feb. 1986 & JP-A-60 193 530 (Canon K.K.) 2 Oct. 1985.

*Primary Examiner*—Shrive Beck
*Assistant Examiner*—Katherine A. Bareford
*Attorney, Agent, or Firm*—Fitzpatrick, Cella, Harper & Scinto

[57] ABSTRACT

A method of forming a monomolecular film capable of independently controlling the process of forming a monomolecular film and the process of removing a part of the monomolecular film which has not been used in monomolecular film formation. The method includes, in addition to spreading a material for forming a monomolecular film onto a water surface, compressing the material on the water surface thereby transforming the material into a monomolecular film, and transferring the monomolecular film on the water surface onto a substrate, storing in a first region a part of the monomolecular film which has not been transferred to the substrate. The first region is located at a distance from a second region for preparing the monomolecular film with respect to a third region for transferring part of the film to the substrate, and has a water level lower than that of the third region.

5 Claims, 4 Drawing Sheets

METHOD AND APPARATUS FOR FORMING MONOMOLECULAR FILM OR BUILT-UP MONOMOLECULAR FILM

This application is a continuation of application Ser. No. 07/891,207 filed Jun. 1, 1992, now abandoned.

BACKGROUND OF THE INVENTION

1. Field of the Invention

The present invention relates to a method and an apparatus for forming a monomolecular film or a built-up monomolecular film. Specifically, the present invention relates to a method of forming a monomolecular film or a built-up monomolecular film which includes a process of removing a remaining portion of a monomolecular film on a water surface after that portion has been stored in a specific region, and to an apparatus for carrying out such a method.

2. Related Background Art

A conventional method of forming a Langmuir-Blodgett (hereinafter abbreviated to "LB") film comprises spreading a material for forming a monomolecular film onto a water surface, two-dimensionally compressing the material on the water surface, thereby preparing a monomolecular film on the water surface, and transferring the monomolecular film onto a solid substrate (by dipping the substrate through the monomolecular film covered surface). Since a water tank, a constituent of the apparatus being used in the LB film formation, is of a certain limited size, a monomolecular film which can be prepared on the surface of the water contained in the water tank has a correspondingly limited area. This means that, as the depositing process is repeated, and portions of the monomolecular film are deposited one after another onto the solid substrate, the area available for the part of the film remaining on the water surface decreases until the area is too small for the remaining portion of the film to be deposited. Therefore, in order for any further deposition to be carried out, the remainder of the monomolecular film remaining on the water surface has to be removed, and a new monomolecular film has to be prepared there. Thus, the conventional LB film formation employs non-continuous processing in which a process of forming a monomolecular film and a process of removing a remainder of the monomolecular film are alternately performed. In order to overcome this problem, continuous film formation methods and apparatuses for carrying out such methods have been recently proposed (for example, by A. Barraud and M. Vandevyver, in "Thin Solid Films" Vol. 99, page 221, 1983; by W. Nitsch and C. Kurthen, in "Thin Solid Films" Vol 178, page 145, 1989; and by O. Albrecht et al. in "Molecular Electronics" edited by F. T. Hong, page 41, Plenum Press NY, 1989).

However, in practice, the continuous methods which have been proposed have the following problems:

A remainder of a monomolecular film on the water surface is removed with an aspirator. When a continuous film forming method, such as above, is employed, since a plurality of remainders of monomolecular films which remain undeposited are continually generated, as a result of the film forming process, one after another on the water surface, it is necessary to remove the remainders with an aspirator in a successive or periodical manner. Further, since removal of film remainder(s) causes a part of the water contained in the tank to be simultaneously removed, it is necessary to add fresh water to the remaining water in the tank in order to maintain the water level. Since the portion of the water which has been removed contains relatively large amounts of impurities, it cannot be readily used again. This makes it necessary to use, at a great expense, a large amount of water to properly fill the water tank. When the water tank must also contain metal ions, etc., an additional expense is incurred. The additional substance, such as metal ions, may be harmful, and the drainage resulting from the removal of parts of water has to be processed, thereby resulting in further expense. This expense increases proportionally with the increase in the amount of water removed. Another problem arising from the removal of film remainder(s) is that such a removal causes an additional flow of water in the water tank, and this flow of water may adversely influence the deposition of a monomolecular film on the water surface onto the substrate.

SUMMARY OF THE INVENTION

An object of the present invention is to provide a method of and an apparatus for forming a monomolecular film that is capable of independently controlling the process of forming a monomolecular film and the process of removing a remaining portion of a monomolecular film which has not been used in the monomolecular film deposition.

Another object of the present invention is to provide a method of and an apparatus for forming a monomolecular film which, during the formation of a monomolecular film, is capable of efficiently removing a remaining portion of the monomolecular film on the water surface, but not deposited on a substrate, with a minimum waste of the water contained in the water tank.

According to an aspect of the present invention, there is a method of forming a monomolecular film or a built-up monomolecular film, which method involves the steps of spreading a material for forming a monomolecular film onto the surface of water, compressing the material on the water surface thereby transforming the material into a monomolecular film, and transferring the monomolecular film on the water surface onto a substrate. The method comprises the steps of: disposing a first region, having a first water level, for storing a portion of the monomolecular film which has not been transferred to the substrate, at a sufficient distance from a second region to prevent contact with the second region, where the monomolecular-film-forming material is spread onto the water surface; arranging the second region to be so located with respect to a third region, the third region having a second water level, wherein the monomolecular film is transported from the second region to the third region; transferring the monomolecular film in the third region to the substrate; and storing the portion of the monomolecular film not transferred to the substrate in the first region, the first water level being lower than the second water level of the third region.

According to another aspect of the present invention, there is an apparatus for forming a monomolecular film or a built-up monomolecular film, the apparatus having a water tank, means for spreading a material for forming a monomolecular film onto the surface of water, means for compressing the material on the water surface thereby transforming the material into a monomolecular film, and means for transferring the monomolecular film on the water surface onto a substrate. The apparatus comprises: a first region for storing a portion of the monomolecular film not deposited on the substrate and a second region for preparing the monomolecular film, the first region being disposed at a sufficient distance from the second region so as to prevent contact with the second region. The second region is arranged with respect to a third region for transmitting the monomolecular film to the third region and transferring part of the monomolecular film onto the substrate, the first region having a water level lower than the water level of the third region.

DETAILED DESCRIPTION OF THE PREFERRED EMBODIMENTS

According to the present invention, a method of forming a monomolecular film includes the following process: during the process of forming a monomolecular film, a part of the monomolecular film which remains on the water surface within the water tank is stored in a specific region of the water surface and, thereafter, periodically removed by suction.

Figure 1:
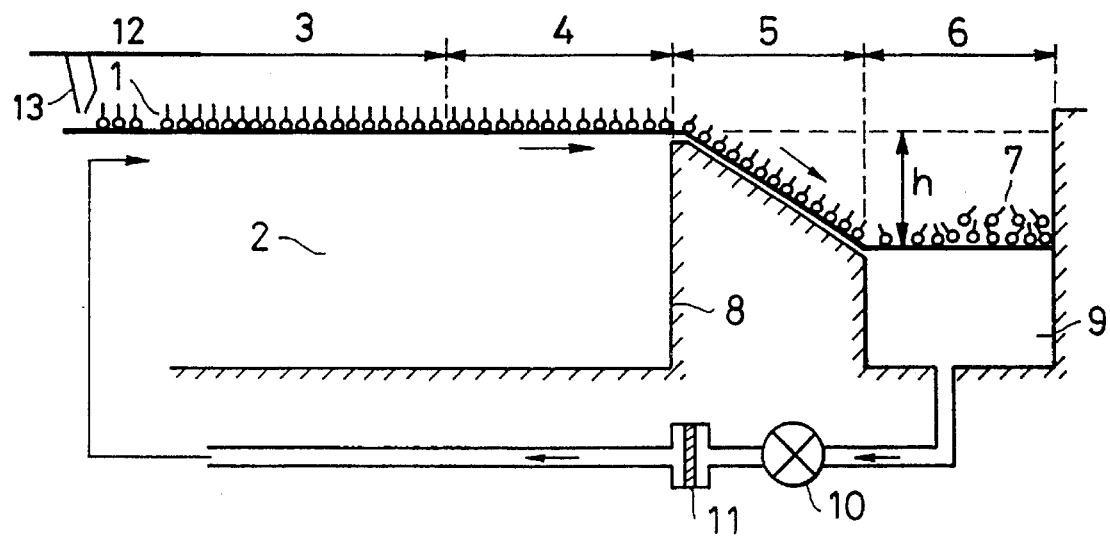
FIG. 1 is a sectional view showing the construction of a monomolecular film forming apparatus which may be used to carry out a monomolecular film forming method according to the present invention.

FIG. 1 shows, in a sectional view, an example of the construction of a monomolecular film forming apparatus which may be used in the present invention. The apparatus has a water tank 2 containing a certain amount of water. A portion of the surface of the water within the tank 2 defines a region 12 (the spread region), upon which a material for forming a monomolecular film 1 is spread from a film-forming spreader 13. Another portion of the surface of the water defines a transfer region 3 for transferring part of the monomolecular film 1 on the water surface onto a substrate (not shown). A storage region 6 (the storage tank) for storing remainders of the monomolecular film 1 remaining on the water surface is connected with the transfer region 3 via a flow rate control region 4 for mechanically controlling the flow rate of the flow of the monomolecular film 1 over the water surface and an inclined region 5 continuing from the control region 4. When part of the monomolecular film 1 is deposited onto the substrate in the transfer region 3, remainders of the film 1 remaining on the water surface are moved over the water surface by utilizing either a flow of water caused on the water surface or a flow of air caused in air above the water surface, thereby sending the monomolecular film remainders to the flow rate control region 4 (the flow rate-adjusting region). In this region 4, the flow rate of the monomolecular film remainders being sent to the storage region 6 is adjusted.

The water tank 2 shown in FIG. 1 has a main section 8 corresponding to the transfer region 3, and a storage section 9 corresponding to the storage region 6. A part of the water which has flowed into the storage section 9 is returned to the main section 8 through a return passage extending through a pump 10 and a filter 11. A heat exchanger (not shown) or the like may be disposed in the return passage so as to control the temperature of the water within the water tank 2. Since a part of the water within the tank 2 is inevitably removed when collapsed film remainders 7, described later, are removed, the water within the tank 2 has to be supplemented as required whenever such is necessary.

Figure 2:
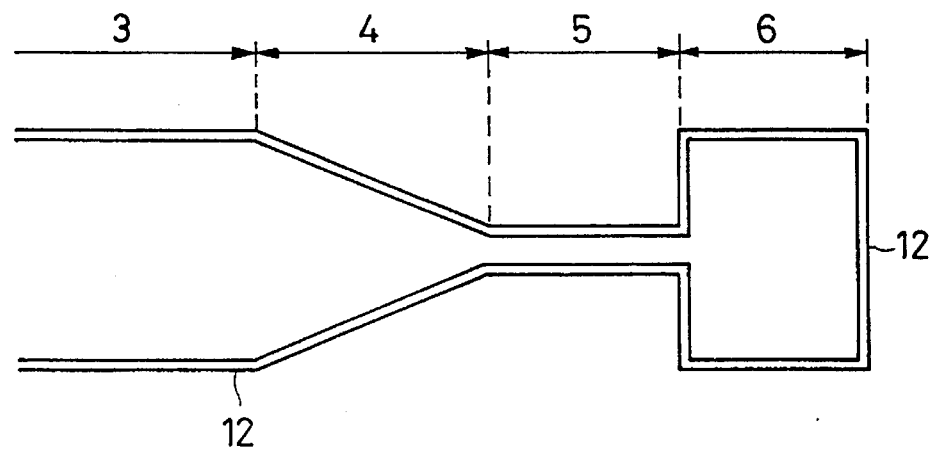
FIG. 2 is a plan view showing an example of the planar configuration of the monomolecular film forming apparatus shown in FIG. 1.
Figure 3:
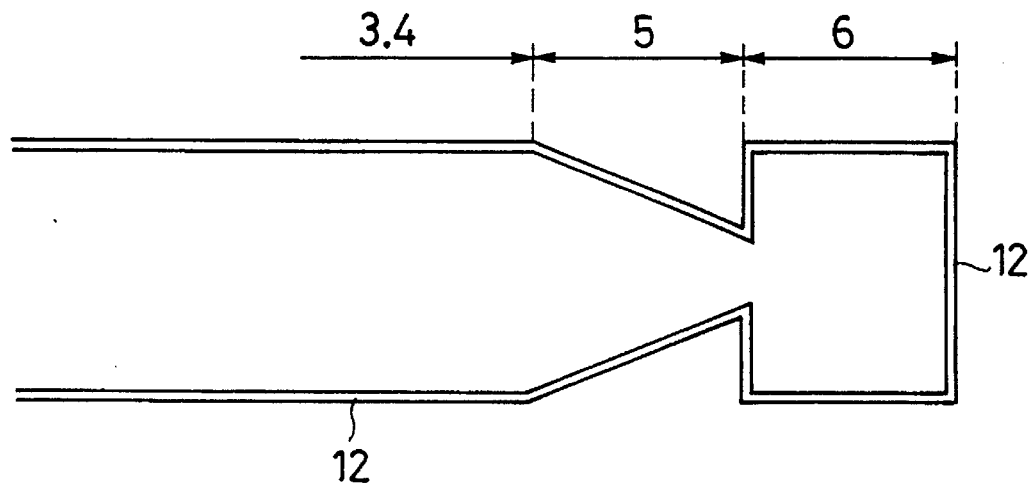
FIG. 3 is a plan view showing another example of the planar configuration of the monomolecular film forming apparatus shown in FIG. 1.
Figure 4:
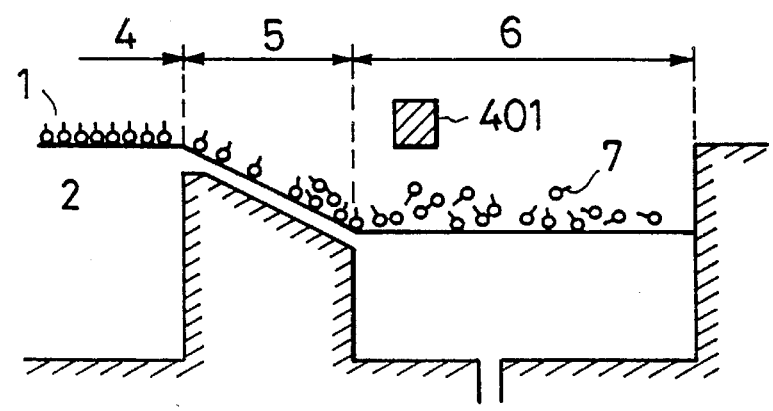
FIG. 4 schematically shows a stage of an example of a process of removing a collapsed film part from the surface of water, the process employing a plate member.

FIG. 2 shows, in a plan view, an example of the planar configuration of the monomolecular film forming apparatus. In the example shown in FIG. 2, the width of the flow rate control region 4 gradually narrows as the distance from the transfer region 3 increases. However, this width need not be narrowed. It is very convenient if the flow rate of the monomolecular film remainders being sent to the storage region 6 can be varied whenever necessary in accordance with the type of the material used to form the monomolecular film and/or the conditions of the monomolecular film formation. For this reason, it is preferable that portion of the wall 12 of the water tank 2 corresponding to the flow rate control region 4 be movable such that the width of the flow rate control region 4 can be freely varied. Further, as shown in FIG. 3, the inclined region 5 may have a width which is not constant but gradually narrows with increases in the distance from the previous region. Alternatively, as shown in FIG. 1, the depth of the water tank 2 may be suitably varied between a plurality of sections of the tank 2 in order to adjust the flow rate of the flow of the molecular film remainders.

The flow of water within the inclined region 5 is accelerated in the above-described manner. The force of the accelerated flow of water causes the monomolecular film remainders which have been sent to the inclined region 5 to collapse (thus, when the remainders of the monomolecular film reach the storage region 6, they include pieces of the film in which the monomolecular state of the film is collapsed). The collapse of the monomolecular film remainders results in the area (a part of the water surface) occupied by the collapsed film remainders 7 being greatly reduced. The flow rate of the flow of water is preferably adjusted to a range from 5 to 10 cm/sec. Although in FIGS. 2 and 3, the inclined region 5 has a narrower width than the transfer region 3, the region 5 may have the same width as the region 3.

Figure 8A:
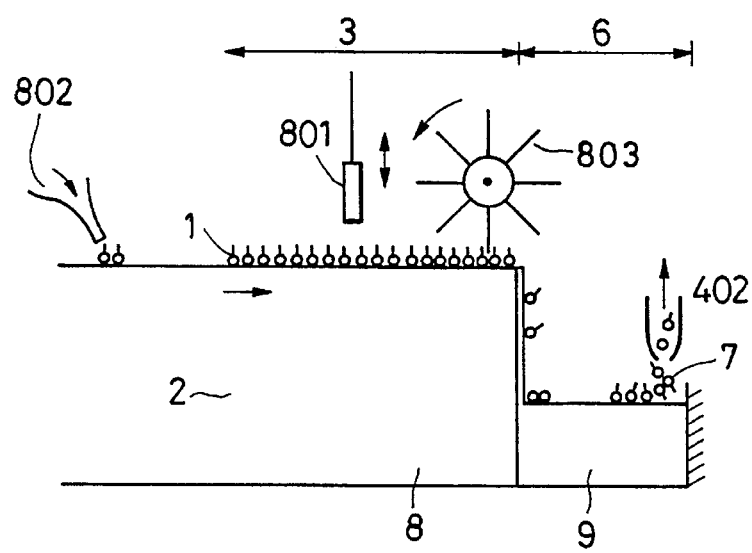
FIGS. 8A and 8B are sectional views showing the construction of another monomolecular film forming apparatus according to the present invention including a mechanism for controlling the film transport from the dipping area to the collapse area.

Thus, a monomolecular film forming apparatus has a transfer region 5 and a storage region 6. It is important that the storage region (first region) be located at a sufficient distance from the region where a material for forming the monomolecular film is spread onto the water surface (second region) to prevent contact with the second region; the second region be located with respect to the region where part of the monomolecular film is transferred to a substrate (third region) so that the monomolecular film is transmitted to the third region; and the water level of the storage (first region) region is lower than the water level of the transfer (third) region. These features are also incorporated in the apparatus shown in FIGS. 8A and 8B, which is thus another embodiment of the monomolecular film forming apparatus according to the present invention. In FIG. 8A, the apparatus includes a film material supplier 802, and a transfer region 3 with respect to which a substrate 801 is vertically moved.

Collapsed film remainders 7 are generated as described above, and stored in the storage region 6. Since the storage region 6 has a water level lower than that of the transfer region 3, the collapsed film remainders 7 are prevented from diffusing backward toward the transfer region 3. A paddle wheel mechanism 803 controls the film transport from the inclined area to the collapse area. The collapsed film remainders 7 stored in the region 6 are removed from the water surface by sucking them with an aspirator 402 or the like. Alternatively, as shown in FIGS. 4 to 7, the collapsed film remainders are removed with an aspirator 402 or the like after the remainders 7 have been mechanically compacted with a plate member 401. Such compacting may be repeated as necessary during film formation. The difference in water level provided in the present invention as between the storage region and the transfer region makes it possible to control the removal of the collapsed film remainders 7 independently of the process of forming the monomolecular film 1. FIG. 8B, alternatively, includes a plurality of barriers 804 for controlling the film transport from the inclined area to the collapse area.

The present invention will now be described by examples.
(Example 1)

LB film formation was performed employing an LB film forming apparatus of the type shown in FIGS. 1 and 2. The main section 8 of the water tank 2 of the apparatus had an area of 150 cm×80 cm. Pure water at 20° C. was contained in the water tank 2, and 22-tricosenoic acid (hereinafter abbreviated to "22-TCA") was used as the film material. After the flow rate of a flow of water on the water surface was adjusted to 7 cm/sec., a certain amount of 22-TCA dissolved in a certain amount of chloroform at a concentration of $5\times10^{-4}$M was spread onto the water surface. Subsequently, the surface pressure was increased to 30 mN/m, thereby obtaining a 22-TCA monomolecular film 1 on the water surface. Thereafter, parts of the 22-TCA monomolecular film were successively deposited onto a silicon (Si) substrate (with a 3-inch diameter) which had a surface previously subjected to a hydrophobic property treatment using hexamethyldisilazane, and which was vertically moved at a speed of 10 mm/sec. In this deposition process, the period of time for which the monomolecular film 1 on the water surface stayed within the transfer region 3 (i.e., the period of time until the monomolecular film 1 on the water surface having the increased surface pressure applied was deposited onto the substrate) was 5 min. A remainder of the monomolecular film 1 remaining on the water surface was passed through the flow rate control region 4, and was collapsed in the inclined region 5. The difference (the dimension h shown in FIG. 1) between the respective water levels of the transfer region 3 and the storage region 6 was adjusted to 10 mm. Collapsed remainders 7 of the monomolecular film 1 were collected into the storage region 6, and no part of such remainders were removed while the film formation proceeded to a certain point (until the monomolecular film 1 was formed into 200 layers). During this time, no part of the stored film remainders diffused backward toward the transfer region 3. After the film 1 was formed into the above-stated number of layers, the collapsed film remainders which had collected in the storage region 6 were removed by aspirating them with an aspirator 402. A part of the water within the water tank 2 was simultaneously removed, the amount of which was not more than 100 ml.
(Comparison Example 1)

A 22-TCA film was formed in exactly the same manner as that in Example 1 except that the water levels in the main and the storage sections 8 and 9 of the tank 2 were exactly the same (i.e., h=0). Remainders of the monomolecular film were removed by aspirating them with an aspirator. After the film was formed into 200 layers, the amount of the water which was suction-removed together with the film remainders totaled 5 liters.
(Example 2)

Figure 5:
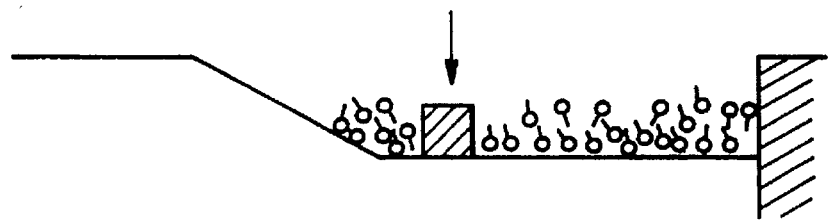
FIG. 5 schematically shows another stage of the process shown in FIG. 4.
Figure 6:
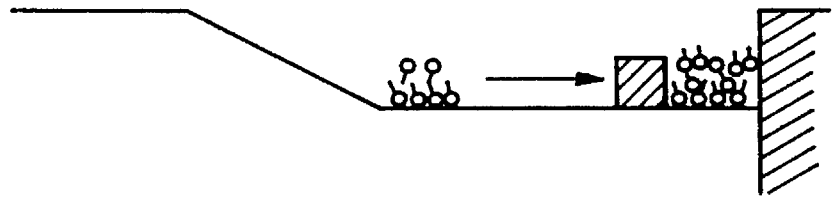
FIG. 6 schematically shows still another stage of the process shown in FIG. 4.
Figure 7:
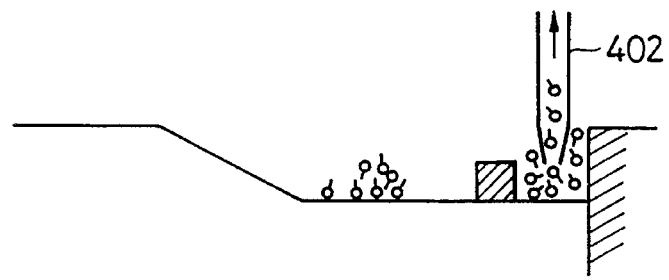
FIG. 7 schematically shows a further stage of the process shown in FIG. 4.
Figure 8B:
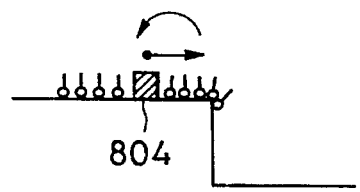

LB film formation was performed in exactly the same manner as that in Example 1 except that the collapsed film remainders 7 which had been collected in the storage region 6 were removed by a process employing a plate member 401, as shown in FIGS. 4 to 7. Specifically, the plate member 401 was oriented toward the collapsed film remainders 7 in the storage region 6 (FIG. 4), and lowered onto the water surface (FIG. 5). The water surface within the region 6 was skimmed with the plate member 401 moving parallel with the water surface (FIG. 6), thereby mechanically compacting the collapsed film remainders 7. Thereafter, an aspirator 402 was used to remove the collapsed film remainders 7 from the water surface (FIG. 7). The amount of that part of the water within the water tank 2 which was simultaneously removed at this time was not more than 200 ml.

As has been described above, the present invention has the following advantages:

(1) Since it is possible to independently control the process of forming a monomolecular film and the process of removing a remainder part of the monomolecular film, the film forming operation can be continuously performed independently of the removal of the remainder part;

(2) Since it is possible to render the amount of water removed together with the unnecessary part of the film material very small, the expenses for the film formation can be reduced to a great extent;

(3) Since it is possible to reduce the number of times unnecessary portions of the film material have to be removed, the expense for the film formation can be accordingly reduced. Furthermore, such removal has less influence on the quality of the monomolecular film on the water surface which is being used in the film formation; and (4) Since the unnecessary part of the film material is stored in a specific region of the water surface which is remote from the transfer region, there is no risk of the unnecessary part of the film material diffusing backward toward the transfer region. This facilitates the formation of a high-quality monomolecular film.

While the present invention has been described with respect to what is presently considered to be the preferred embodiments, it is to be understood that the invention is not limited to the disclosed embodiments. The present invention is intended to cover the various modifications and equivalent arrangements included within the spirit and scope of the appended claims.

What is claimed is:

1. In the method for forming a monomolecular film or a built-up monomolecular film by spreading a monomolecular-film-forming material onto a water surface, compressing said material on the water surface, thereby transforming said material into a monomolecular film, and transferring said monomolecular film on the water surface onto a substrate, the improvement which comprises the steps of:

(a) providing a main tank which has a spread region for spreading said monomolecular-film-forming material, a transfer region for transferring said monomolecular film onto said substrate and a flow-rate-adjusting region for compressing said material;

(b) providing a storage tank for storing a remainder of said monomolecular film which has not been transferred to said substrate;

(c) storing water in said main tank and said storage tank wherein the water level of said main tank is higher than the water level of said storage tank;

(d) moving said monomolecular-film-forming material spread on the water surface from said spread region to said transfer region, and from said transfer region to said flow-rate-adjusting region by generating water or air flow to the water surface;

(e) transferring said monomolecular film onto said substrate by dipping said substrate into water in said transfer region;

(f) moving said a remainder of said monomolecular film which has not been transferred to said substrate to said storage tank;

(g) removing said remainder of said film in said storage region; and (h) circulating said water in said storage tank through a return passage to said main tank.

2. A method for forming a monomolecular film or a built-up monomolecular film according to claim 1, wherein said monomolecular film is moved through an inclined region provided between said flow-rate-adjusting region and said storage tank in step (d).

3. An apparatus for forming a monomolecular film or a built-up monomolecular film by spreading a monomolecular-film-forming material onto a water surface, compressing said material on the water surface, thereby transforming said material into a monomolecular film, and transferring said monomolecular film onto a substrate, comprising:

a main tank which has a spread region for spreading said monomolecular-film-forming material, a transfer region for transferring said monomolecular film onto said substrate and a flow-rate-adjusting region for compressing said material;

a storage tank for storing a remainder of said monomolecular film which has not been transferred to said substrate, wherein, when water is stored in said main tank and said storage tank, the water level of said main tank is higher than the water level of said storage tank;

means for generating water or air flow wherein said means cause said monomolecular film-forming material to move from said spread region to said transfer region, from said transfer region to said flow-rate-adjusting region, and from said flow-rate-adjusting region to said storage tank;

means for removing said remainder of said monomolecular film which has not been transferred to said substrate and stored in said storage tank; and means for circulating water in said storage tank to said main tank.

4. An apparatus for forming a monomolecular film or a built-up monomolecular film according to claim 3, wherein an inclined region is provided between said flow-rate-adjusting region and said storage tank.

5. The apparatus of claim 3, further comprising a plate member for compacting said remainder of said monomolecular film at said storage tank.

* * * * *